US006573814B1

(12) United States Patent
Ichikawa et al.

(10) Patent No.: US 6,573,814 B1
(45) Date of Patent: Jun. 3, 2003

(54) ELECTROMAGNETIC RELAY AND CIRCUIT SUBSTRATE COMPRISING THE SAME

(75) Inventors: Kazuhiro Ichikawa, Tokyo (JP); Tatsumi Ide, Tokyo (JP); Kazuyoshi Nago, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/603,507

(22) Filed: Jun. 26, 2000

(30) Foreign Application Priority Data

Jun. 30, 1999 (JP) .......................................... 11-186708

(51) Int. Cl.[7] ................................................ H01H 67/02
(52) U.S. Cl. ....................................... 335/128; 335/202
(58) Field of Search ............................ 335/78–86, 124, 335/128, 202

(56) References Cited

U.S. PATENT DOCUMENTS 4,959,627 A * 9/1990 Iizumi et al. ............... 335/106
5,216,396 A * 6/1993 Stahly ......................... 335/80
5,216,397 A * 6/1993 Matsuoka et al. ............ 335/83
6,184,762 B1 * 2/2001 Reiss et al. ................. 335/202

FOREIGN PATENT DOCUMENTS

| | | |
|---|---|---|
| DE | 198 32 966 | 7/1999 |
| JP | 02-139821 | 5/1990 |
| JP | 04-267027 | 9/1992 |
| JP | 7-41941 | 7/1995 |
| JP | 3043616 | 9/1997 |
| JP | 10-309938 | 11/1998 |
| JP | 11-98871 | 4/1999 |
| JP | 11-141231 | 5/1999 |
| JP | 2000-073656 | 3/2000 |
| JP | 2000-182497 | 6/2000 |

* cited by examiner

*Primary Examiner*—Lincoln Donovan
(74) *Attorney, Agent, or Firm*—Katten Muchin Zavis Rosenman

(57) ABSTRACT

An electromagnetic relay and a circuit substrate comprising the same are disclosed, for preventing erroneous operation when they are wet by water, at low cost. The electromagnetic relay comprises a case having fluid-tight characteristics; an excitation coil provided in the case; and electrodes connected to both ends of the excitation coil in a manner such that at least a portion of each electrodes is formed outside the case and is exposed to an area where a liquid can penetrate.

9 Claims, 9 Drawing Sheets

ELECTROMAGNETIC RELAY AND CIRCUIT SUBSTRATE COMPRISING THE SAME

BACKGROUND OF THE INVENTION

1. Field of the Invention

The present invention relates to an electromagnetic relay and a circuit substrate comprising the same, and in particular, to those for preventing erroneous operation when they are wet by water from condensation or the like.

2. Description of the Related Art

A typical power window (apparatus) provided in a car comprises an electromagnetic relay for normally and reversely rotating a motor for opening or closing the window (pane). The circuit substrate on which the electromagnetic relay is attached may adopt a specific structure for preventing erroneous operation of the motor due to water leakage caused by condensation or the like. For example, a sensor for detecting water leakage is provided in the circuit substrate, and when the sensor detects a leakage, the motor is driven using a specific circuit other than the usual circuit. Japanese Unexamined Patent Application, First Publication, No. Hei 11-98871 discloses an example of such a technique.

However, in the conventional technique, if a leakage occurs at the coil terminal of the electromagnetic relay which is wet by water, current flows through the coil and the electromagnetic relay may not accurately operate. Therefore, in the above case of using a wet coil terminal of the electromagnetic relay, the electromagnetic relay may inaccurately operate regardless of whether it executes a sensor operation for detecting water leakage. In order to prevent such inaccurate operation, the electromagnetic relay and the circuit substrate may be sealed using a resin material or the like, but this causes a large increase in the necessary costs.

SUMMARY OF THE INVENTION

In consideration of the above circumstances, an objective of the present invention is to provide an electromagnetic relay and circuit substrate comprising the same for preventing erroneous operation when they are wet by water, at low cost.

Therefore, the present invention provides an electromagnetic relay comprising:

a case having fluid-tight characteristics;

an excitation coil provided in the case; and electrodes connected to both ends of the excitation coil in a manner such that at least a portion of each electrode is formed outside the case and is exposed to an area where a liquid can penetrate.

Accordingly, when the electromagnetic relay is wet by or immersed in an electrically conductive liquid, a parallel circuit consisting of the excitation coil and an area between the electrodes is formed so as to prevent a current from flowing at the electromagnetic relay caused by a leakage current flowing through another portion. Therefore, erroneous operation caused by a leakage current can be prevented.

In the above basic structure, the electrodes may have a plate-like shape and closely face each other. Accordingly, an optimum resistance can be obtained by adjusting the area of the electrodes and the distance between the electrodes. In addition, if the electrodes are attached to an outside face of the case, it is possible to detect the penetration of liquid (such as water) before the liquid reaches the faces of the case. Therefore, erroneous operation can be prevented as quickly as possible.

Also in the above basic structure, the electrodes may have a plate-like shape, and may be arranged on the same plane and close to each other. Accordingly, an optimum resistance can be obtained by adjusting the area of the electrodes and the distance between the electrodes. In addition, if the electrodes are attached to an outside face of the case, the occupied space can be smaller. Therefore, a smaller device can be manufactured.

Also in the above basic structure, the electrodes may be attached to an outside face of the case. Accordingly, the electromagnetic relay efficiently functions as an assembly for preventing erroneous operation caused by the penetration of water or the like. Therefore, the flexibility for general use can be improved.

Also in the above basic structure, the electrodes may be insert-molded inside the case, and a portion of each electrode may be exposed outside the case. Accordingly, the electrodes can be inserted when the case is formed. Therefore, the manufacturing costs can be decreased in comparison with the case of attaching the electrodes after the assembly of each relevant part is finished.

Typically, when the area between the electrodes is immersed in an electrically conductive liquid, a leakage current flows between the electrodes. Accordingly, it is possible to prevent a current from flowing at the excitation coil side. Therefore, erroneous operation can be reliably prevented.

The present invention also provides a circuit substrate comprising an electromagnetic relay having any of the structures as explained above, wherein only one of the electrodes is provided at the electromagnetic relay side while the other is provided at the circuit substrate side. Accordingly, when the electrode at the electromagnetic relay side and the electrode at the circuit substrate side are immersed by an electrically conductive liquid, a leakage current can flow between the electrodes. Therefore, it is possible to prevent a current from flowing at the excitation coil side is such a case, thereby preventing erroneous operation of the electromagnetic relay.

The present invention also provides an electromagnetic relay comprising:

a case having fluid-tight characteristics; and an excitation coil, provided in the case, having two coil terminals at both ends thereof, each coil terminal protruding outside the case, wherein one of the coil terminals functions as the earth side, and at least said earth-side coil terminal is shielded by a shield for preventing leakage from the earth-side coil terminal.

According to this structure, it is possible to prevent leakage from the coil terminal at the earth side by the shield. In addition, the electromagnetic relay having this structure can be manufactured only by adding the above shield to the conventional structure.

The present invention also provides an electromagnetic relay comprising:

a case having fluid-tight characteristics; and an excitation coil, provided in the case, having two coil terminals at both ends thereof, each coil terminal protruding outside the case, wherein each protruding portion is bent and the portion beyond the bend is used as an electrode.

According to this structure, (plate-like) electrodes can be omitted, thereby decreasing the necessary costs.

Typically, the electromagnetic relay as explained above is used in a drive circuit for driving a motor for opening and closing a window of a power window apparatus of a vehicle. Accordingly, it is possible to prevent a problem in the operation of opening/closing a window provided in a vehicle door which tends to be penetrated by water or the like. Therefore, the reliability as a vehicle part can be improved.

The present invention also provides a circuit substrate comprising an electromagnetic relay as explained above. Accordingly, the measures for preventing erroneous operation caused by a penetrating liquid can be practiced at the electromagnetic relay side. Therefore, the reliability of the whole circuit substrate can be improved without limiting the kind of the circuit substrate.

BRIEF DESCRIPTION OF THE DRAWINGS

FIG. 5B is a graph showing a relationship between the area of each electrode and the leakage resistance while

FIG. 14A shows a state in which coil terminals pass through the insert base while FIG. 14B is a diagram showing the bottom face of the seventh embodiment.

DESCRIPTION OF THE PREFERRED EMBODIMENTS

Hereinafter, embodiments according to the present invention will be explained with reference to the drawings.

Figure 1:
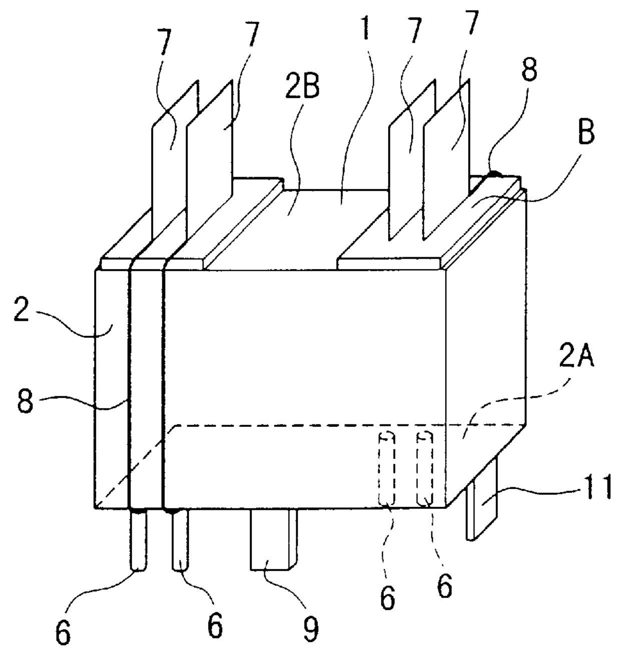
FIG. 1 is a perspective view showing the structure of the first embodiment according to the present invention.
Figure 2:
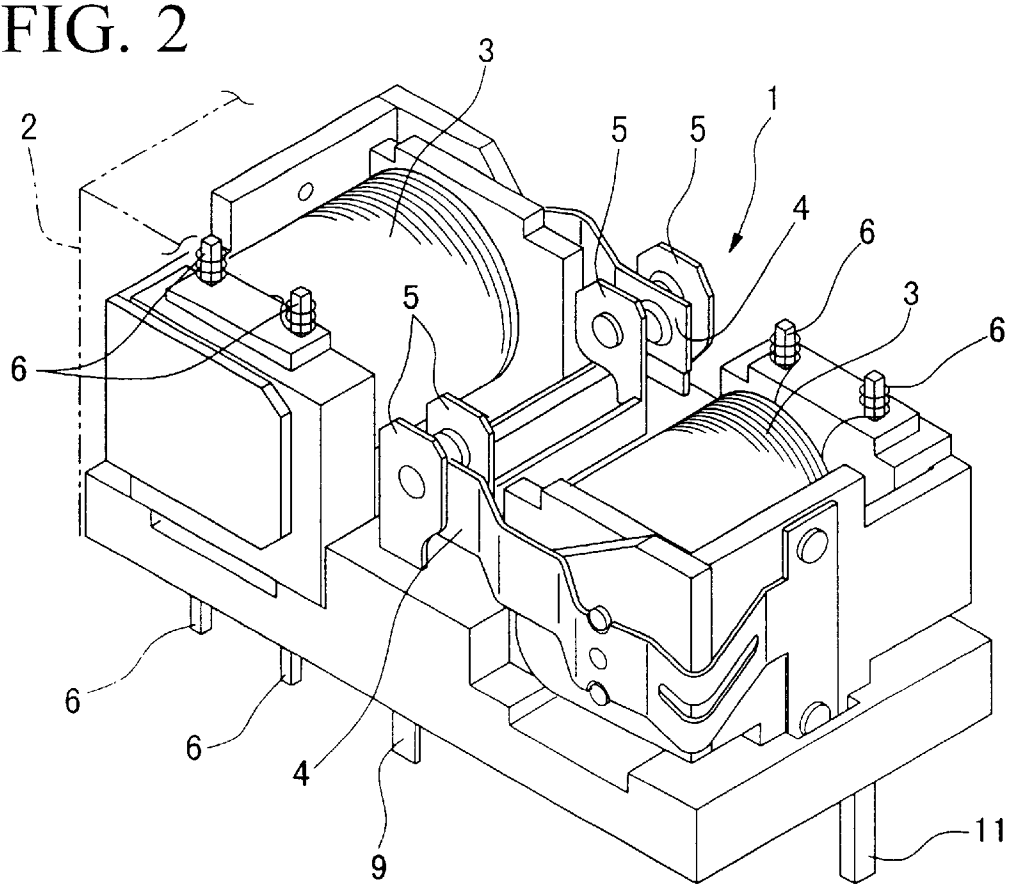
FIG. 2 is a perspective view showing the observed structure without the case, in the first embodiment.
Figure 3:
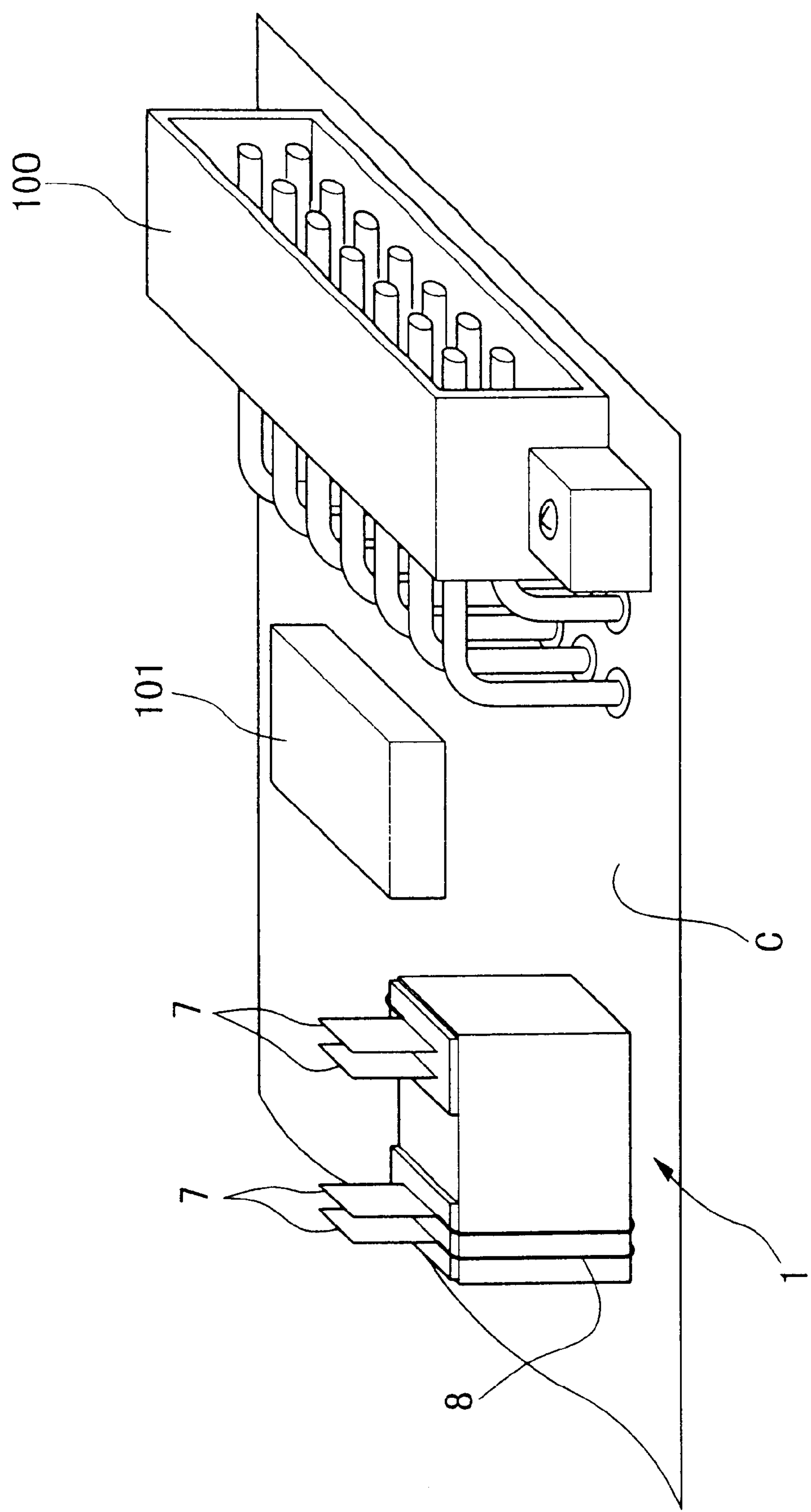
FIG. 3 is a perspective view showing the circuit substrate to which the electromagnetic relay of the first embodiment is attached.

FIGS. 1 to 7 are diagrams for explaining the first embodiment. In FIGS. 1 to 3, reference numeral 1 indicates an electromagnetic relay which is mounted on circuit substrate C of the power (or automatic) window of a car. More specifically, the circuit substrate C comprises a drive circuit for normally/reversely rotating a motor for opening/closing the window (pane). In FIG. 3, reference numeral 100 indicates an external connection terminal section, and reference numeral 101 indicates an electronic circuit section.

As shown in FIG. 2, the electromagnetic relay 1 of the present embodiment (also of the following embodiments) has case 2 in which a pair of excitation coils (one is for the normal rotation, and the other is for the reverse rotation) is provided. When the switch (provided in the door) for opening or closing the window is operated, one of excitation coils 3 is excited so that relevant movable contact 4 contacts corresponding fixed contact 5, thereby normally or reversely rotating the motor. The ends of the excitation coils 3 are connected to coil terminals 6, 6 which protrude from bottom attachment face 2A (of case 2) as shown in FIG. 1. In the packaged state using case 2, the electromagnetic relay 1 can secure the fluid-tight characteristics, that is, water or the like cannot penetrate into the case 2.

As shown in FIG. 1, electrodes 7, 7 are respectively connected to the coil terminals 6, 6 of each excitation coil 3. Each electrode 7 is a plate-like member having a rectangular shape and is attached to the top face 2B (of case 2) which is opposed to the bottom attachment face 2A. The electrode 7 is connected via wiring 8 to the corresponding coil terminal 6 which protrudes from the bottom attachment face 2A side. In addition, electrodes 7, 7 of each pair, connected to the coil terminals 6, 6 of one of the excitation coils 3, closely face each other on base B, and two pairs of such facing electrodes are attached on the top face 2B of case 2. Therefore, the above two pairs of electrodes 7, 7 are externally arranged on the case 2, that is, exposed to an area where water can penetrate. Here, various kinds of materials may be used for forming electrodes 7, 7, such as a Cu alloy having a small resistance; however, in order to economically realize a rust preventative structure, it is preferable to use a stainless material or a noble metal such as Au.

Figure 4:
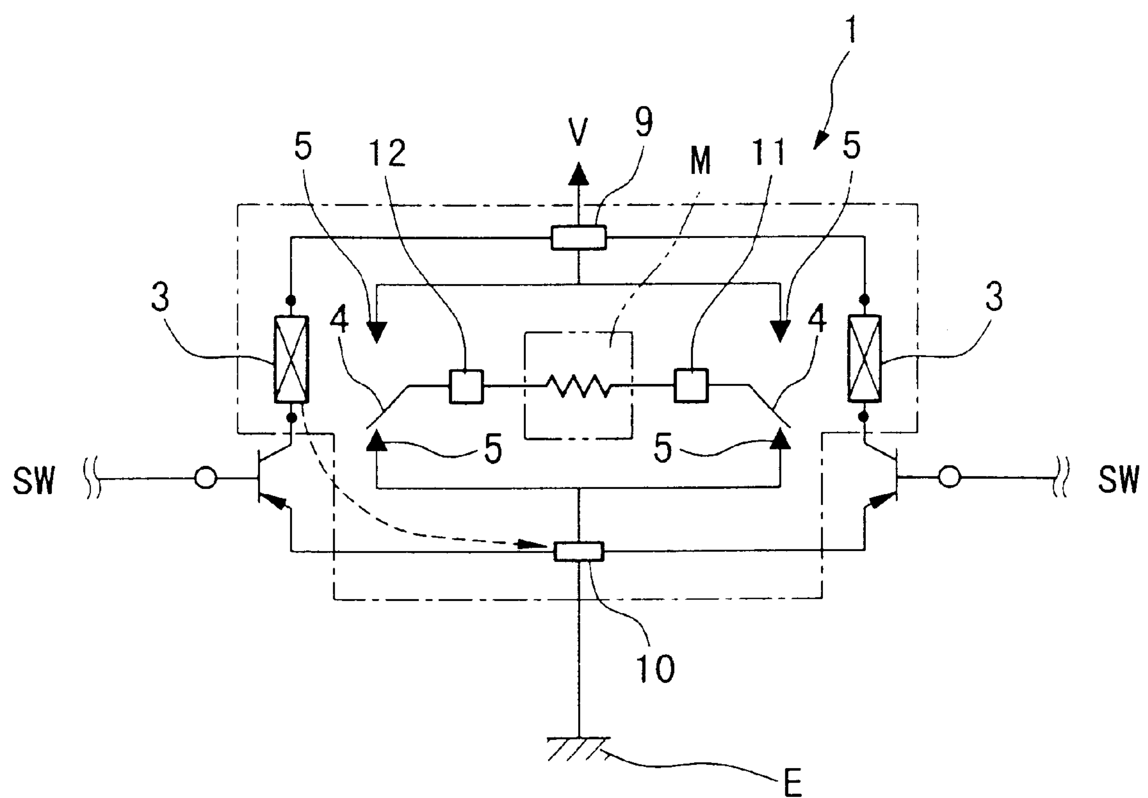
FIG. 4 is a diagram showing a drive circuit for driving a motor for opening/closing the window of a typical power window.

FIG. 4 shows a circuit arrangement of the electromagnetic relay 1. In the figure, electromagnetic relay 1 occupies the area surrounded by the alternate long and short dashed line. Reference numeral 9 indicates the STm terminal connected to the source side, reference numeral 10 indicates the STb terminal connected to the ground (earth: E) side, and reference numerals 11 and 12 indicate the COM terminals connected to motor M. Accordingly, when the switch SW is operated for moving the window up, the movable contact 4, for example, at the left side is connected to the fixed contact 5 by the excitation coil 3, so that the motor M is normally rotated (i.e., in the normal direction) and the window panel is moved upward. When the switch SW is operated for moving the window down, the movable contact 4, for example, at the right side is connected to the fixed contact 5 by the excitation coil 3, so that the motor M is reversely rotated (i.e., in the reverse direction) and the window panel is moved downward. In FIG. 4, electrodes 7, 7 are omitted.

Below, an example of a case in which the electromagnetic relay 1 on the circuit substrate 1 is wet by or immersed in water such as rainwater or seawater is given.

As explained above by referring to FIG. 4, while the electromagnetic relay 1 accurately operates, motor M rotates in the normal or reverse direction according to the operation of a driver using switch SW. However, if the circuit substrate C is wet by or immersed in water or the like, a leakage current may flow from an end of the excitation coil 3 at the left side (of the electromagnetic relay 1) to the STb terminal 10, as shown by the dotted arrow in FIG. 4. According to such a leakage current, conventionally, the movable contact 4 may move by the excitation coil 3, thereby causing erroneous operation of motor M.

Figure 6:
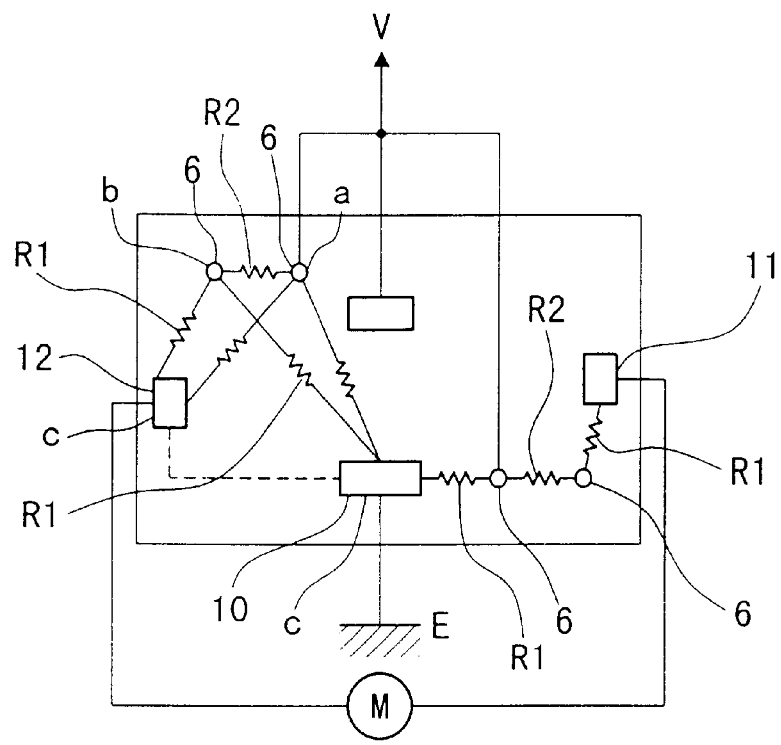
FIG. 6 is a diagram showing the leakage path in the electromagnetic relay.
Figure 7:
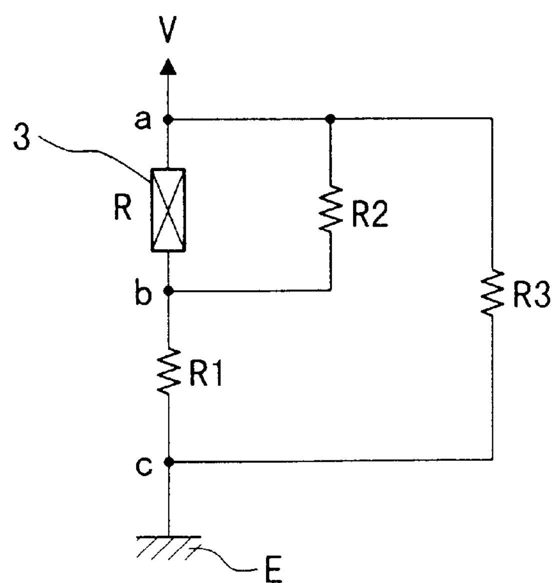
FIG. 7 is a diagram showing an equivalent circuit of the circuit shown in FIG. 6.

Such a situation is shown by FIG. 6 which shows the leakage path and FIG. 7 which shows the equivalent circuit thereof. The equivalent circuit of FIG. 7 consists of excitation coil 3, leakage resistance R2 provided in parallel with the excitation coil 3, leakage resistance R1 connected in series with the excitation coil 3, and resistance R3 which leaks between points a and c. In this structure, when the following formula is satisfied, the electromagnetic relay 1 works or operates.

$$Va-c=\frac{\frac{Rcoil\times R2}{Rcoil+R2}}{R1+\frac{Rcoil\times R2}{Rcoil+R2}}\times V\geq Vope \tag{1}$$

where V indicates the voltage of the battery (14V), and Vope indicates the operation (or working) voltage.

Therefore, in the present embodiment, electrodes 7, 7 are determined for setting a resistance R2 for which the above formula (1) is not satisfied. That is, the electrodes 7, 7 are determined for setting the resistance R2 so that the following formula (2) is satisfied.

$$\frac{\frac{Rcoil\times R2}{Rcoil+R2}}{R1+\frac{Rcoil\times R2}{Rcoil+R2}}\times V< Vope \tag{2}$$

Figure 5A:
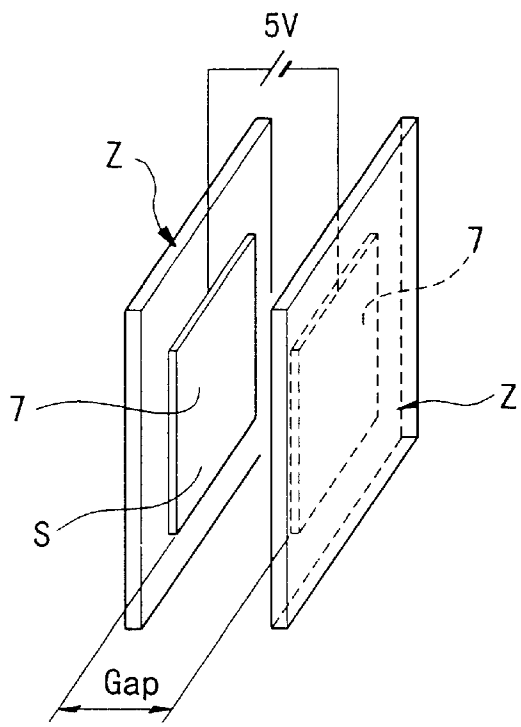
FIG. 5A is a perspective view showing the electrodes of the first embodiment.
Figure 5B:
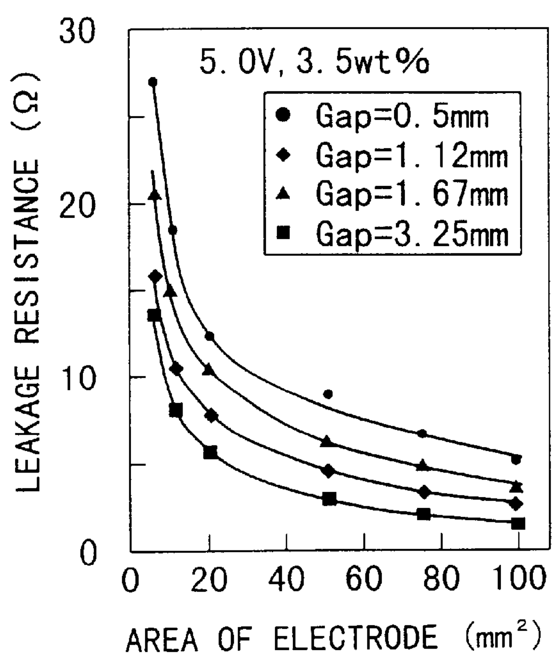
Figure 5C:
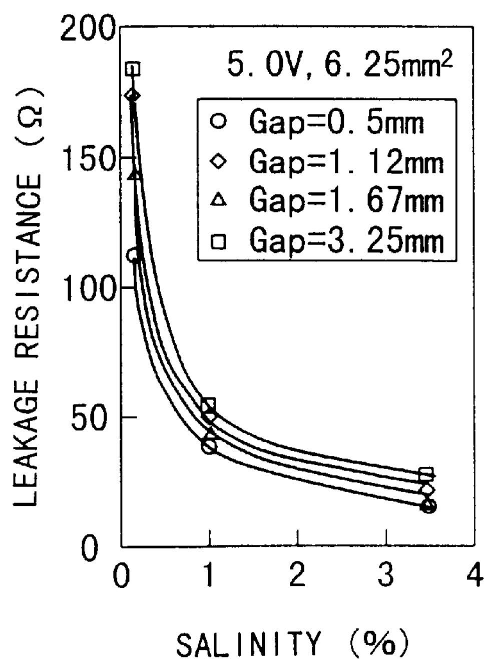
FIG. 5C is a graph showing a relationship between the salinity and the leakage resistance.

Here, resistance R2 depends on area S of electrode 7 and gap "Gap". According to an experiment (see FIG. 5A) in which plate-like electrodes 7, 7 made of BeCu are attached to insulating plates Z, Z by using an epoxy resin, and 5V is applied between the electrodes, it is obvious that the leakage resistance changes depending on the salinity and the area of the electrodes, as shown in FIGS. 5B and 5C.

The resistance R1 in the above formula (1) is determined (i.e., different) by the kind of the liquid (here, seawater is assumed), and the resistance R2 between the electrodes 7, 7 can be suitably determined based on the results of the above experiment, that is, in consideration of a salinity of 0 to 3.5 wt % which remarkably affects the electric resistance.

According to the present embodiment, even if the electromagnetic relay 1 comprising the electrodes 7, 7 is wet by or immersed in rainwater, seawater, or the like, the area between the electrodes 7, 7 functions as a resistance R2 connected in parallel with the excitation coil 3, and according to the resistance R2 (formed by the electrodes 7, 7), it is possible to prevent the operation voltage "Vope" from being applied to the excitation coil 3. As a result, it is possible to reliably prevent erroneous activation of the motor M (while the switch is not operated), and to improve the reliability of electromagnetic relay 1 as a car part.

As shown in FIG. 3, the above electromagnetic relay 1 is attached to the circuit substrate C and is connected to an external device via external connection terminal section 100. Here, only electromagnetic relay 1 should be modified, and no special modification is necessary for the circuit substrate C. Therefore, erroneous operation can be prevented at low cost. Additionally, in the above measures, the kind of circuit substrate C is not limited, thereby improving flexibility for general use. Furthermore, penetrating water can be detected very quickly via the electrodes 7, 7 attached to the top face 2B of case 2, thereby performing speedy prevention of erroneous operation.

Figure 8A:
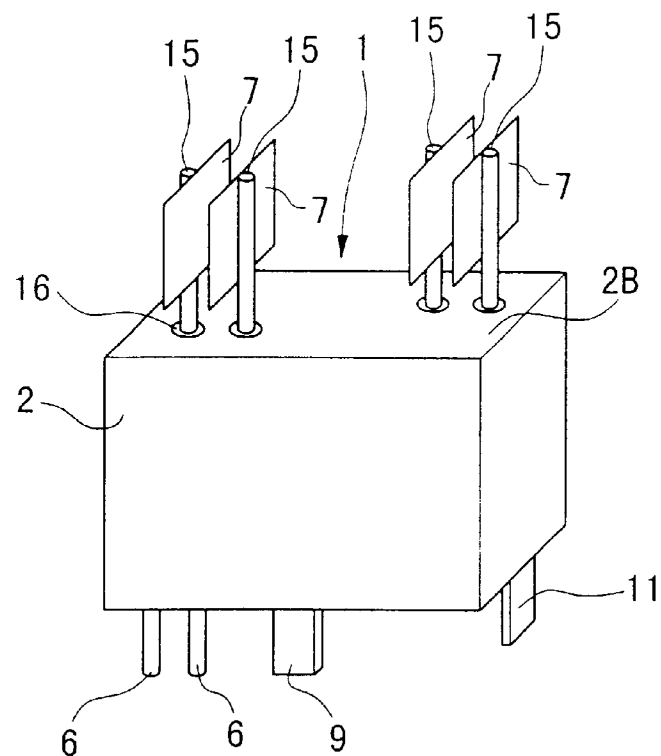
FIG. 8A is a perspective view showing the structure of the second embodiment according to the present invention.
Figure 8B:
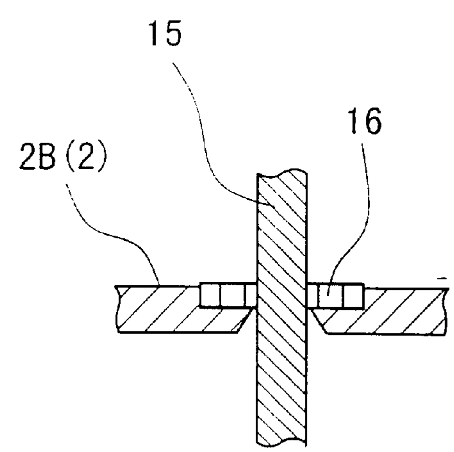
FIG. 8B is a partially-enlarged sectional view of the structure shown in FIG. 8A.

FIGS. 8A and 8B show the second embodiment according to the present invention. In the figures, reference numerals 15 indicate extensions. Each extension 15 is a portion of coil terminal 6, which extends from the top face 2A of case 2. A plate-like electrode 7 is attached to each extension 15 in a manner such that the surfaces of two adjacent electrodes face each other as shown in FIG. 8A. Around the portion (of extension 15) crossing the top face 2B of case 2, seal member 16 is provided as shown in FIG. 2B so as to secure the fluid-tight characteristics of case 2. Also in the second embodiment, two pairs of the above-explained facing electrodes are provided. Here, parts identical to those in the first embodiment are given identical reference numerals, and explanations thereof are omitted (the following embodiments also have similar omissions).

Therefore, according to the present embodiment, wiring can be omitted; thus, in addition to the effects obtained by the first embodiment, less production time is necessary in comparison with the case of soldering both ends of wiring 8.

Figure 9:
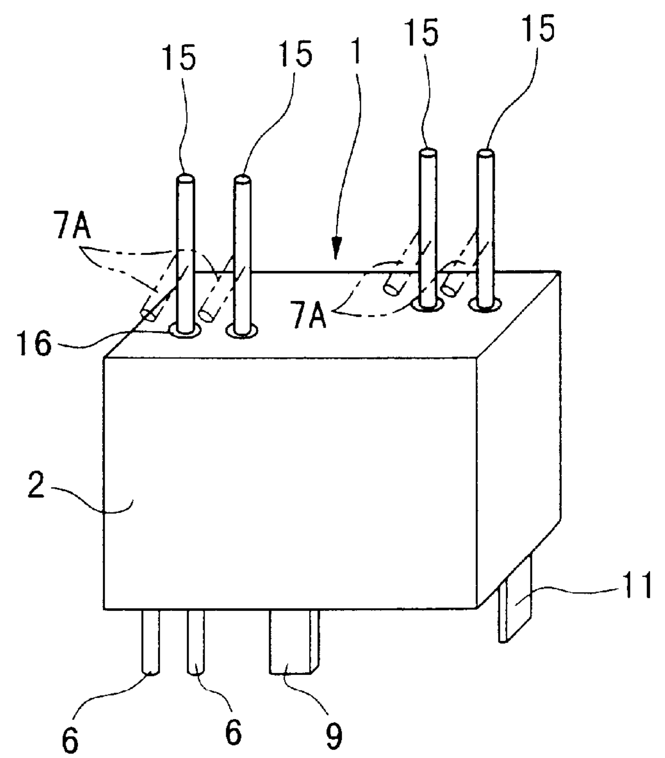
FIG. 9 is a perspective view showing the structure of the third embodiment according to the present invention.

FIG. 9 shows the third embodiment according to the present invention. In this embodiment, each extension 15 provided in the above second embodiment is bent so as to use the extension itself as electrode 7A. Therefore, according to the present embodiment, in addition to the effects obtained by the first embodiment, plate-like electrodes can be omitted, thereby decreasing the necessary costs.

Figure 10:
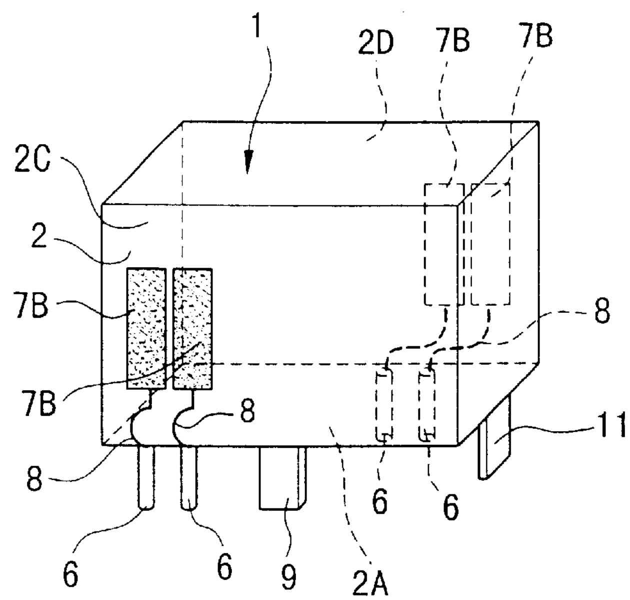
FIG. 10 is a perspective view showing the structure of the fourth embodiment according to the present invention.

FIG. 10 shows the fourth embodiment according to the present invention. In this embodiment, two pairs of electrodes 7B, 7B (as provided in the first embodiment) are respectively attached to front face 2C and back face 2D (see FIG. 10). More specifically, two pairs of coil terminals 6, 6 protrude from bottom attachment face 2A of case 2, where the two pairs are respectively provided close to the front face 2C and the back face 2D. In addition, a pair of rectangular plate-like electrodes 7B, 7B is formed in each of the front face 2C and back face 2D, where the electrodes of each pair are close to each other, and are arranged near the coil terminals 6, 6. The electrodes 7B, 7B are connected to corresponding coil terminals 6, 6 via each wiring line 8.

The pairs of electrodes 7B may be provided in the side faces (i.e., right and left side faces) of case 2 shown in FIG. 10.

Figure 11A:
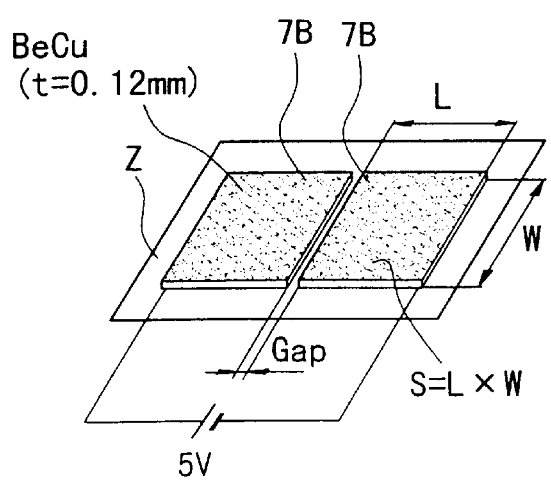
FIG. 11A is a perspective view showing the electrodes of the fourth embodiment.
Figure 11B:
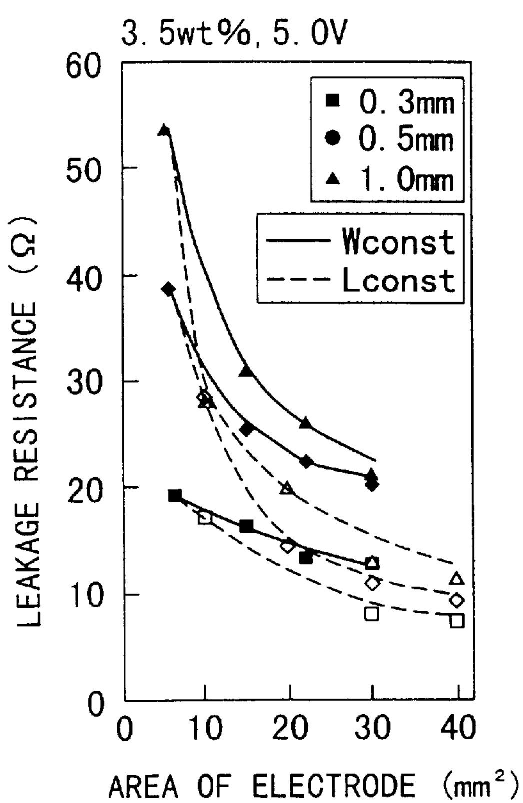
FIG. 11B is a graph showing a relationship between the area of each electrode and the leakage resistance.

As in the first embodiment, resistance R2 is determined depending on the area S of electrode 7B (S=L×W) and gap "Gap". As shown in FIG. 1A, plate-like electrodes 7, 7 made of BeCu are attached to insulating plate Z by using an epoxy resin. According to an experiment of applying 5V between the electrodes, it is obvious that the leakage resistance changes depending on the salinity and the area of the electrodes, as shown in FIG. 11B.

Accordingly, even when the electrodes 7B are horizontally placed as in the present embodiment, resistance R2 between the electrodes 7B, 7B is preferably determined based on the results of the above experiment, in consideration of a salinity of 0 to 3.5 wt % which remarkably affects the electric resistance.

Therefore, also in the present embodiment, even if the electromagnetic relay 1 comprising the electrodes 7B, 7B is wet by or immersed in rainwater, seawater, or the like, the area between the electrodes 7B, 7B functions as a resistance R2 connected in parallel with the excitation coil 3, and according to the resistance R2 (formed by the electrodes 7B, 7B), it is possible to prevent the operation voltage "Vope" from being applied to the excitation coil 3. As a result, it is possible to reliably prevent erroneous activation of the motor M (while the switch is not operated).

Also, as in the first embodiment, the electromagnetic relay 1 is attached to the circuit substrate C, and is connected to an external device via the external connection terminal section 100 as shown in FIG. 3. In this structure, only electromagnetic relay 1 should be modified, and no special modification is necessary for the circuit substrate C. Therefore, erroneous operation can be prevented at low cost.

Additionally, in the above measures, the kind of circuit substrate C is not limited, thereby improving the flexibility for general use.

Additionally, in the present embodiment, electrodes 7B, 7B are attached to the outer surface of the electromagnetic relay 1, such as front face 2C and back face 2D of case 2; thus, the body can be smaller in comparison with the first embodiment in which the electrodes are attached to the top face of case 1 in a protruding form.

Figure 12:
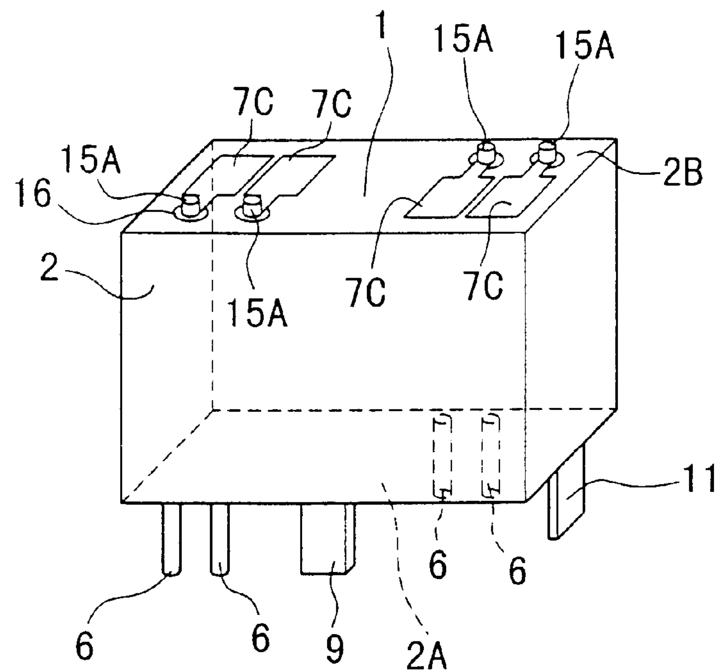
FIG. 12 is a perspective view showing the structure of the fifth embodiment according to the present invention.

FIG. 12 shows the fifth embodiment according to the present invention. In this embodiment, as in the second embodiment, extensions 15A are provided, where each extension 15A is a portion of coil terminal 6, which slightly extends from the top face 2A of case 2. A rectangular plate-like electrode 7C (as the electrode used in the fourth embodiment) is horizontally attached to each extension 15A in a manner such that the surfaces of two adjacent electrodes are close to each other as shown in FIG. 12. Accordingly, on the top face 2B of case 2, two pairs of electrodes 7C, 7C are attached in a manner such that the directions of these pairs are opposed to each other. Also in the fifth embodiment, seal member 16 is provided around the extension 15A, as in the second embodiment.

Therefore, according to this embodiment, in addition to the effects obtained by the first embodiment, the process of soldering both ends of the wiring (8) can be omitted, and a smaller device can be manufactured, which occupies a smaller area.

Figure 13:
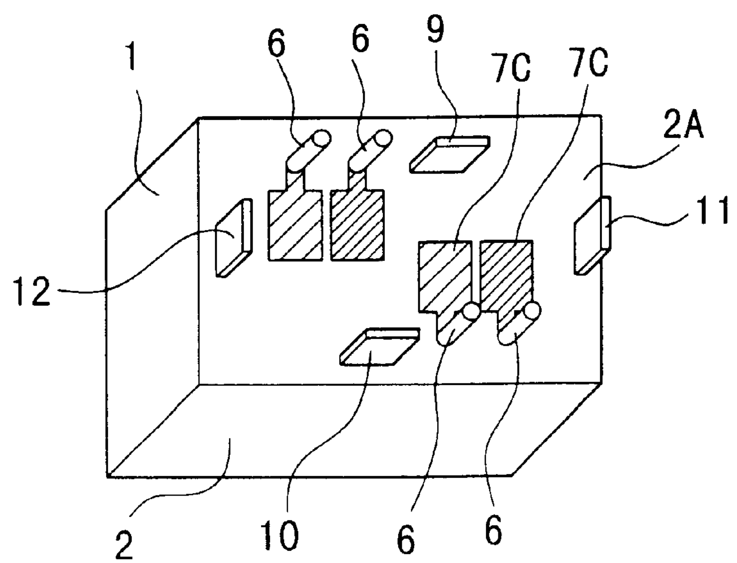
FIG. 13 is a perspective view showing the structure of the sixth embodiment according to the present invention.

FIG. 13 shows the sixth embodiment according to the present invention. In this embodiment, rectangular plate-like electrodes 7C, 7C are directly attached to the coil terminals 6, 6 which protrude from the bottom attachment face 2A of case 2. Two pairs of electrodes 7C, 7C are attached to the bottom attachment face 2A, and each pair of electrodes 7C, 7C close to each other is horizontally arranged on the face.

According to the present embodiment, in addition to the effects obtained by the first embodiment, the necessary cost can be remarkably decreased because both wiring 8 and seal member 16 are unnecessary.

Figure 14A:
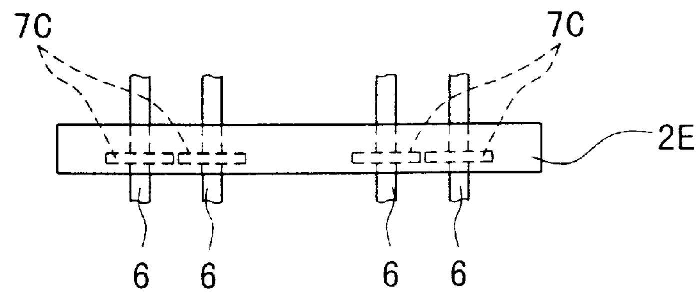
FIGS. 14A and 14B show the structure of the seventh embodiment according to the present invention.
Figure 14B:
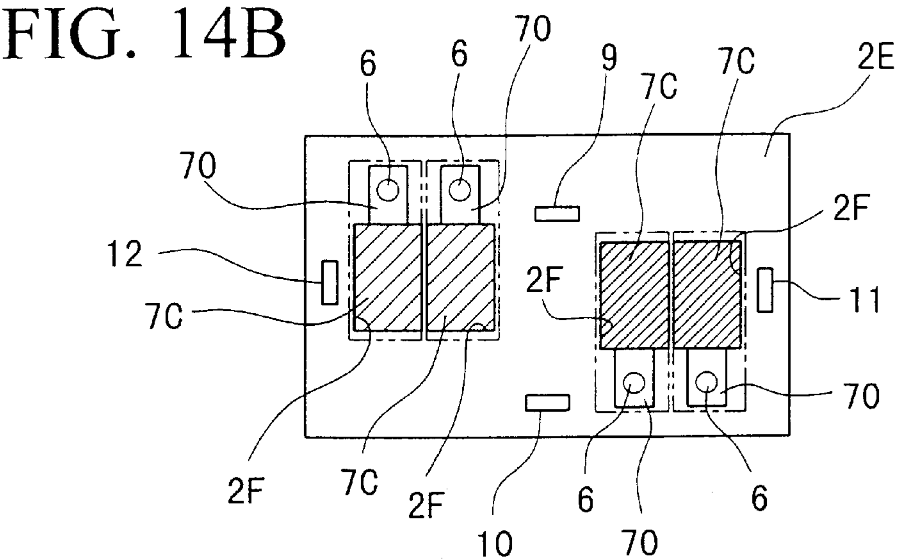

FIGS. 14A and 14B show the seventh embodiment according to the present invention. In this embodiment, the bottom wall of case 2 is formed as insert base 2E as shown in FIG. 14A, and rectangular plate-like electrodes 7C, 7C are connected to the coil terminals 6, 6 by the press-fitting method, where base 70 of each electrode is sealed using an epoxy resin. Windows (or openings) 2F are opened in the insert base 2E as shown in FIG. 14B, through which the electrodes 7C, 7C are exposed to the outside. The adjacent electrodes 7C, 7C are close to each other and horizontally embedded in the insert base. Each exposed area of the electrode is determined depending on the window size of the window 2F; thus, the optimum exposed area of electrode 7C can be adjusted by suitably forming the window 2F.

Therefore, according to the present embodiment, in addition to the effects obtained by the first embodiment, the necessary production time can be decreased because the insert base 2E and the electrodes 7C, 7C can be integrally molded and no wiring or soldering process is necessary. In addition, in manufacture using an automatic manufacturing machine, a process similar to those used in conventional manufacturing can be applied only by substituting the insert base 2E for a corresponding (conventional) portion, thereby realizing the present invention at low cost.

Figure 15:
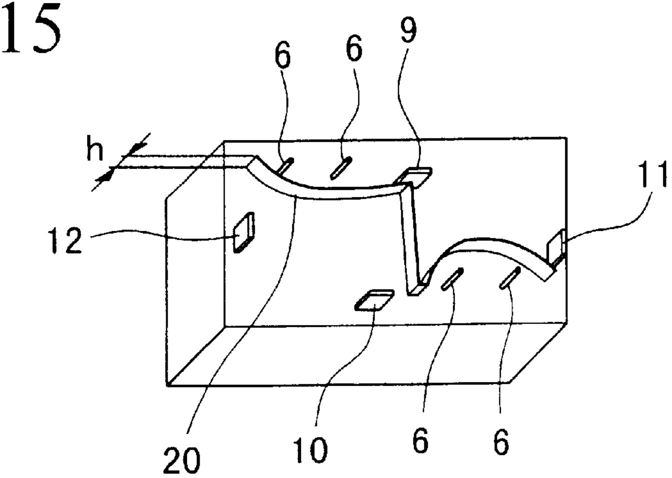
FIG. 15 is a perspective view showing the structure of the eighth embodiment according to the present invention.

FIG. 15 shows the eighth embodiment according to the present invention. In this embodiment, each pair of coil terminals 6, 6 is shielded by shield (portion) 20. This shield 20 is connected to the STm terminal 9 at the power supply side, so as to prevent a leakage current with respect to the COM terminals 11 and 12 functioning as the earth sides. Preferably, the height h of the shield 20 is as high as possible if the shield is not an obstruction for attaching the electromagnetic relay 1.

Therefore, also according to the present embodiment, the voltage between the coil terminals 6, 6 can be decreased by suppressing leakage from the coil terminals 6, 6 by using the shield 20, thereby preventing erroneous operation of motor M when the device is wet or immersed in rainwater or the like. Additionally, in this embodiment, the only necessary measure is to add shield 20; thus, the conventional structure can be generally used.

The present invention is not limited to the above-explained embodiments. For example, the insert base (2E) in the seventh embodiment may also formed as a front, rear, or side wall, which is molded with inserted electrodes (i.e., insert-molding method). In addition, in the above embodiments, two excitation coils 3 are contained in case 2; however, the excitation coils may be separately contained.

Also in the above embodiments, each pair of electrodes is provided at the electromagnetic relay 1 side; however, one of the electrodes may be provided at the circuit substrate C side, that is, each pair consists of the electrode provided at the electromagnetic relay 1 side and the electrode provided at the circuit substrate C side.

What is claimed is:

1. An electromagnetic relay comprising:

a case preventing a liquid from penetrating an interior of the case;

an excitation coil, provided in the case, having first and second coil terminals which are respectively connected to a first end and a second end of the excitation coil, each coil terminal protruding outside the case, wherein one of the coil terminals functions as an earth side; and electrodes respectively connected to the coil terminals protruding from the case, wherein at least a portion of each electrode is exposed beyond an exterior of the case, and wherein a leakage resistance between the exposed portions of the electrodes is formed when the exterior of the case is at least wetted by a conductive liquid, the leakage resistance being connected in parallel with the excitation coil so as to cause a voltage across the excitation coil to fall below a minimum level required for operating the excitation coil.

2. A circuit substrate comprising an electromagnetic relay as claimed in claim 1.

3. The circuit substrate as claimed in claim 2, wherein only one of the electrodes is attached to the electromagnetic relay, and the other is provided on the circuit substrate separate from the electromagnetic relay.

4. An electromagnetic relay as claimed in claim 1, which is used in a drive circuit for driving a motor for opening and closing a window of a power window apparatus of a vehicle.

5. A circuit substrate claimed in claim 3, wherein the electromagnetic relay is used in a drive circuit for driving a motor for opening and closing a window of a power window apparatus of a vehicle.

6. An electromagnetic relay as claimed in claim 1, wherein the leakage resistance is determined depending on a gap between the electrodes.

7. An electromagnetic relay as claimed in claim 1, wherein the leakage resistance is determined depending on an area of each electrode.

8. An electromagnetic relay as claimed in claim 1, wherein the electrodes are plates, and face each other.

9. An electromagnetic relay as claimed in claim 1, wherein the electrodes are attached to the exterior of the case.

* * * * *

UNITED STATES PATENT AND TRADEMARK OFFICE

CERTIFICATE OF CORRECTION

PATENT NO. : 6,573,814 B1
DATED : June 3, 2003
INVENTOR(S) : Kazuhiro Ichikawa et al.

It is certified that error appears in the above-identified patent and that said Letters Patent is hereby corrected as shown below:

Title page,
Item [73], Assignee, should read as follows:

-- [73] Assignee: NEC TOKIN Corporation, Sendai (JP) --.

Signed and Sealed this

Fourth Day of November, 2003

JAMES E. ROGAN
*Director of the United States Patent and Trademark Office*

UNITED STATES PATENT AND TRADEMARK OFFICE

CERTIFICATE OF CORRECTION

PATENT NO. : 6,573,814 B1
DATED : June 26, 2000
INVENTOR(S) : K. Ichikawa et al.

It is certified that error appears in the above-identified patent and that said Letters Patent is hereby corrected as shown below:

Title page,
Item [73], Assignee, please correct to read:
-- NEC TOKIN Corporation, Miyagi (JP) --.

Signed and Sealed this

Twentieth Day of September, 2005

JON W. DUDAS
*Director of the United States Patent and Trademark Office*